3,849,507
ALKYLATION OF AROMATIC HYDROCARBONS USING A COMPACTED MONTMORILLONITE CLAY CATALYST
Ernest A. Zuech, Bartlesville, Okla., assignor to Phillips Petroleum Company
No Drawing. Filed Mar. 2, 1973, Ser. No. 337,371
Int. Cl. C07c 3/52
U.S. Cl. 260—671 C                                    7 Claims

ABSTRACT OF THE DISCLOSURE

Aromatic hydrocarbons such as benzene are alkylated in the liquid phase in the presence of a catalyst which is compacted montmorillonite clay.

BACKGROUND OF THE INVENTION

Field of the invention

This invention relates to a catalyst for the alkylation of aromatic hydrocarbons.

Related prior art

The alkylation or aromatic hydrocarbons has, in the past, been accomplished using a variety of processes. For example, the addition of olefins to aromatics has often been carried out in the presence of catalysts such as solid phosphoric acid, sulfuric acid, hydrofluoric acid or anhydrous aluminum chloride.

Aromatic hydrocarbons have also been alkylated in the presence of clay catalysts. For example, the use of activated clay catalysts in the alkylation of benzene has been described in U.S. Pat. No. 2,242,960 and the use of certain acid-washed clays for this purpose has been disclosed in U.S. Pat. No. 2,115,884.

Further, aromatic hydrocarbons have been alkylated in the presence of montmorillonite clay catalysts wherein the clay is used in powdered form. Thus, U.S. Pat. No. 2,564,488 describes the alkylation of toluene with propylene using "Super-Filtrol," an acid-activated montmorillonite clay, having a particle size of about 8 to 20 mesh, i.e., the particles would pass through an opening having a size in the range of 0.093-0.0328 inches. Similarly, U.S. Pat. No. 2,930,819 discloses the use of powdered "Filtrol-13," another type of montmorillonite clay, as a catalyst for the alkylation of benzene with propylene. In that patent, the catalyst particle size is such that 100% of the material passes through a 100 mesh screen and 73% passes through a 325 mesh screen.

OBJECTS OF THE INVENTION

It is an object of this invention to provide a new catalyst.

It is another object of this invention to provide a new catalyst for use in the alkylation of aromatic hydrocarbons.

It is a further object of this invention to provide a new catalyst for use in the alkylation of aromatic hydrocarbons which will result in unusually high yields of said alkylated aromatic hydrocarbons.

STATEMENT OF THE INVENTION

It has now been found that unusually high yields of alkylated aromatics can be obtained when the alkylation takes place in the liquid phase in the presence of a montmorillonite clay which has been compacted into tablets or pellets.

More specifically, in accordance with the invention, aromatic hydrocarbons such as benzene are alkylated in the liquid phase with acyclic olefins in the presence of a montmorillonite clay catalyst which is compacted in pellet or tablet form. Specifically, it has been found that when the alkylation of aromatic hydrocarbons is carried out in the liquid phase in the presence of the above-described catalyst, alkylated hydrocarbons are obtained in very good yields.

Alkylated aromatics such as alkylated benzenes prepared in accordance with this invention are valuable as antiknock and antidetonation additives for gasoline motor fuels.

DESCRIPTION OF PREFERRED EMBODIMENTS

Suitable catalysts in accordance with the instant invention are montmorillonite clays which have been compacted.

Montmorillonite is a clay of the bentonite type, which has, as its major constituents, silica and alumina, and which also contains minor amounts of alkali metal oxides or alkaline earth metal oxides. A typical composition for a montmorillonite clay is $$(Mg.Ca)O\text{---}Al_2O_3\text{---}4SiO_2 \cdot nH_2O.$$

In a preferred embodiment, the montmorillonite catalyst may be used in the acid-activated form, a process for preparing which is described in U.S. Pat. No. 2,579,576. The acid-activation process is characterized by a multi-stage treatment wherein the clay is repeatedly treated with acid solutions, so that the clay reacts with the acid. Acids used in this process include mineral acids such as hydrochloric, sulfuric, nitric, and phosphoric acids.

A number of montmorillonite clays of the type useful herein are sold under the tradename of "Filtrol," sold by Filtrol Corporation, Vernon, Calif. "Filtrol" is defined in the "Handbook of Material Tradenames" (Zimmerman and LaVine) as an acid-activated montmorillonite clay 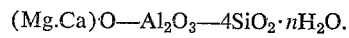 $(Mg.Ca)O\text{---}Al_2O_3 \cdot 4SiO_2 \cdot nH_2O$. Specifically useful Filtrol clays include Filtrol grade 71 which is 21 percent water and 79 percent clay, the clay portion having the following composition (analyzed on a volatile free basis): 71.2% $SiO_2$, 16.5% $Al_2O_3$, 3.6% $Fe_2O_3$, 3.2% MgO, 2.6% CaO, 1.3% $SO_3$, 1.0% $Na_2O+K_2O$, and 0.6% $TiO_2$. Filtrol grades 49 and 62 are also useful in the invention. Filtrol grade 49 and grade 62 clays have the following composition: 74.0% $SiO_2$, 17.5% $Al_2O_3$, 4.5% MgO and 1.4% $Fe_2O_3$.

It is essential that the montmorillonite clays used in this invention be employed in a compacted state. In the instant process, it has been found that montmorillonite clays are unusually efficacious when they are employed in a compacted state rather than as finely divided powders.

Montmorillonite clay can be compacted by art-recognized methods as discussed in Chemical Engineering, October 1951, pp. 161 et seq. In one such method, essentially "dry" (except for the presence of chemically bound water) powdered clay is formed into tablets, pills, pellets and the like in the presence of a lubricant such as graphite by precompressing the powdered clay into oversize tablets, then breaking the oversize tablets down into granules of uniform size, which are then compressed into finished tablets.

In another such method, a slurry, paste or dough of the montmorillonite clay is admixed with a voltaile liquid, usually water, to form shaped and compacted montmorillonite pellets, or extruded shapes such as cylinders, tubes, and the like by conventional methods.

Regardless of the method used, the final compacted montmorillonite clay should be in the form of a tablet or pellet which has a crushing strength of from 3 to 15 pounds, and preferably from 3 to 10 pounds. An optimum crushing strength for use in this reaction appears to be about 5 pounds. The crushing strength of the compacted catalyst is conveniently measured by a device described in U.S. Pat. No. 2,976,723. The material being tableted is exposed to compacting forces and the resulting crushing strength is generally a function of the pressure of the compacting forces and the time of exposure to such forces, assuming that all other conditions are kept constant. Generally, the longer the duration of the pelleting step, the higher the crushing strength of the pellet. In forming the extruded catalyst, it is generally the case that the higher the pressure employed, the higher the crushing strength of the extrudate. It is believed that the compacted montmorillonite clay catalysts defined by the crushing strength range stated above are characterized by an optimum porosity for the alkylation reaction described below to take place.

The final overall dmensions of the compacted montmorillonite clay catalyst useful in this invention should generally be within the range of 1/32 inch to 1/4 inch diameter and 1/64 inch to 3/8 inch thickness. Preferred size ranges for the catalyst are 1/16 inch to 1/4 inch diameter and 1/16 inch to 1/4 inch thickness. Tablets of about one eight inch diameter and about one eighth inch thickness are particularly useful in this invention. As is known in the art, for the maximum per pass conversion of reactants, flow rates of the reactants over the catalysts will be adjusted to correlate with tablet size, e.g., higher flow rates can be employed if small tablets are used rather than large tablets. Generally, for high efficiency of operation, the maximum dimension of the compacted catalyst particle should be about 4 to 50 times smaller than the catalyst chamber diameter.

Aromatic hydrocarbons which can be alkylated in accordance with this invention can be represented by the general formula $$Z(R'')n$$

wherein $n$ is one or two, Z is phenyl if $n$ is one and phenylene when $n$ is two, and R'' is hydrogen or an alkyl radical having from one to twelve carbon atoms. If $n$ is two and each R'' is an alkyl radical, the radicals may be the same or different. Suitable aromatic hydrocarbons are further defined as preferably having from six to twenty carbon atoms per molecule.

Examples of suitable aromatic compounds include benzene, toluene, ethylbenzene, cumene, n-octylbenzene, n-dodecylbenzene, m-xylene, p-xylene, o-xylene, t-butylbenzene, p-cymene, 4-ethyl-n-dodecylbenzene and the like.

Suitable acyclic olefins for use in alkylating the aromatic hydrocarbons can be represented by the general formula

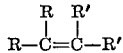

wherein R is hydrogen or R', and R' is an alkyl radical having from one to six carbon atoms. In a given compound, the R' radicals can be the same or different. Said olefins are further defined in that they preefrably have from four to twelve carbon atoms per molecule, and more preferably, four to eight carbon atoms per molecule. Examples of suitable olefins include isobutylene (2-methylpropene), 2,3-dimethyl-2-butene, 2-methyl-2-butene, 2-methyl-1-pentene, 2-methyl-1-octene, 3-methyl-2-hexene, 3-methyl-2-undecene, 3-ethyl-3-hexene and the like. Mixtures of suitable olefins can be employed if so desired and mixtures of isomeric suitable olefins are often conveniently employed, e.g., 2-methyl-2-butene and 2-methyl-1-butene.

The temperature employed for the alkylation reaction of this invention is generally within the range of 100–200° C., and is preferably within the range of 125–175° C.

The pressure employed will depend, to some extent, on the temperature, but will generally be in the range of from 100–1,000 p.s.i.g., and preferably from 200–500 p.s.i.g. In any event, the pressure utilized should be sufficient to maintain the aromatic hydrocarbon substantially completely in the liquid phase. Maintaining the reaction in the liquid phase appears to decrease olefin oligomerization and polyalkylation of the aromatic hydrocarbons, thus decreasing the amount of "heavies" produced in the reaction and increasing the yields of the desired product.

The molar ratio of aromatic hydrocarbon to olefin in the reactant feedstream is generally in the range of from 1/1 to 25/1, preferably from 5/1 to 15/1. A molar ratio of near 10/1 appears to offer the best compromise between a minimum recycling of the aromatic hydrocarbon and a maximum in the yield of alkylation product.

The flow rate of the reactants through the reaction zone can be expressed in terms of liquid hourly space velocity (LHSV), i.e., liquid volumes of reactants per volume of catalyst per hour. These rates are broadly within the range of from 0.1–25 LHSV, preferably from 2–5 LHSV.

The effluent from the reaction zone can be conventionally fractionated to separate the unreacted aromatic hydrocarbon and olefin so that they can be recycled to the reaction zone as indicated above. Fractional distillation also can be employed to recover the desired alkylation product.

SPECIFIC EXAMPLES

Example I

A number of control runs were conducted in which 2-methyl-2-butene (Phillips Pure Grade, 9 mol percent) was reacted with benzene over a commercially available powdered montmorillonite clay (Filtrol grade 71).

The size of the powdered clay used in this Example was characterized as follows:

| Percent passing through screen: | Mesh size |
| --- | --- |
| 100 | 16 |
| 98 | 30 |
| 35 | 60 |
| 1 | 200 |

In these runs, the benzene (A)/olefin (B) reaction mixture was pumped into the top of a heated vertical tubular steel reactor containing the catalyst at a flow rate of 3 LHSV. The reactor effluent was sampled and said samples analyzed by gas-liquid chromatography (GLC). Other conditions employed in these runs and the results obtained are shown in Table I below.

TABLE I

| Run number | Temperature, °C. | Pressure, p.s.i.g. | Mol ratio, A/B | Products (weight, percent)[a] | | | |
| --- | --- | --- | --- | --- | --- | --- | --- |
| | | | | $C_5$ olefin | Olefin dimer | Amylbenzenes | Heavies |
| 1 | 125 | 500 | 10/1 | 2.9 | 28.1 | 36.9 | 32.1 |
| 2 | 150 | 500 | 10/1 | 2.2 | 26.4 | 32.9 | 37.8 |
| 3 | 150 | 500 | 20/1 | 1.7 | 25.0 | 34.5 | 38.8 |
| 4 | 175 | 200 | 10/1 | 9.1 | 18.3 | 36.6 | 36.0 |

[a] Unreacted benzene was excluded from these calculations so that the values shown are normalized to reflect this fact.

In all of the Examples, heavies may include olefin oligomers, polyalkylated aromatics, alkylation products of olefin oligomers, and the like.

The results of these runs demonstrated that a considerable amount of olefin dimer was formed and that the yield of the desired amylbenzene represented only about 1/3 of the product mixture (excluding unreacted benzene) when a powdered montmorillonite clay catalyst was employed under the conditions shown.

Example II

Another series of runs was made in the same reactor system as described in Example I. However, in these runs, all conducted at 150° C., the powdered montmorillonite catalyst employed in Example I was tableted with 3 wt. percent graphite as a lubricant, using the above-described "dry" process to provide tablets of about 1/8 inch diameter and about 1/8 inch thickness with a crushing strength of 4 p.s.i. (average) as measured with the device disclosed in U.S. 2,976,723. The results of these runs and other conditions employed are shown in Table II below.

TABLE II

| Run number | Pressure, p.s.i.g. | LHSV | Mol ratio, A/B | Products (weight, percent)[a] | | | |
|---|---|---|---|---|---|---|---|
| | | | | $C_5$ olefin | Olefin dimer | Amyl- benzenes | Heavies |
| 5 [b] | 500 | 2.2 | 15/1 | 0.9 | 15.7 | 49.1 | 34.3 |
| 6 [b] | 500 | 3.4 | 10/1 | 1.8 | 12.6 | 52.7 | 32.9 |
| 7 [b] | 500 | 6.4 | 10/1 | 3.5 | 10.6 | 61.2 | 24.7 |
| 8 [c] | 500 | 5.4 | 10/1 | 3.6 | 15.1 | 51.8 | 29.5 |
| 9 [c] | 500 | 5.4 | 10/1 | 5.6 | 11.2 | 56.8 | 26.4 |
| 10 [c] | 500 | 5.4 | 10/1 | 6.1 | 12.3 | 60.4 | 21.2 |
| 11 [c] | 200 | 5.4 | 10/1 | 5.6 | 10.2 | 62.2 | 22.0 |
| 12 [c] | 200 | 5.4 | 10/1 | 3.9 | 11.8 | 62.9 | 21.4 |

[a] Values normalized excluding unreacted benzene.
[b] Phillips pure grade (99 mol percent) 2-methyl-2-butene was used.
[c] Phillips 90 percent grade 2-methyl-2-butene was used. Analysis by GLC indicated this material comprised 87 percent 2-methyl-2-butene and 7 percent 2-methyl-1-butene.

Runs 8–12 of Table II are actually samples taken with increasing time during a single run of about 30 hours duration. Runs 11 and 12 represent a difference of about 4 hours. Thus, these results demonstrate an increase in catalyst selectively for amylbenzene with increasing time on stream and also the lack of a catalyst activity decrease over the 30-hour period.

The above results also show that the use of the tableted montmorillonite clay catalyst gave reduced yields of the undesirable by-products, olefin dimer and heavies, while the yield of amylbenzene was significantly increased (compared to the runs of Example I).

The amylbenzene fraction was found to typically contain about 71% t-amylbenzene and about 28% of the isomer 3-methyl-2-phenylbutane.

Example III

Other runs were made employing the tableted catalyst of Example II in the same reactor system but at different temperatures. These runs were conducted at a pressure of 200 p.s.i.g., a flow rate of 2.9 LHSV, and a mol ratio of benzene/olefin (A/B) of 10/1. The 2-methyl-2-butene used in Runs 8–12 was also employed in the runs shown below in Table III.

TABLE III

| Run number | Temperature, °C. | Products (weight, percent)[a] | | | |
|---|---|---|---|---|---|
| | | $C_5$ olefin | Olefin dimer | Amyl- benzenes | Heavies |
| 13 | 110 | 18.8 | 37.6 | 19.7 | 23.9 |
| 14 | 125 | 4.5 | 16.9 | 32.8 | 45.9 |
| 15 | 175 | 3.1 | 8.3 | 66.2 | 22.4 |

[a] Values normalized excluding unreacted benzene.

These results taken with those of Table II indicate that temperatures of about 150° C. and higher provide improved results compared to the lower temperatures when employing the tableted montmorillonite clay catalysts.

Example IV

Additional runs were conducted in which the tableted montmorillonite clay catalyst was varied by changing the average crushing strength of the catalyst tablets. This was accomplished merely by varying the duration and pressure of the tableting operation. In each instance, the same powdered montmorillonite clay that was used in Example I was employed to prepare the tablets with 3% by wt. added graphite lubricant. The runs of the instant example were conducted in the same reactor system previously employed at a temperature of 150° C. and at a pressure of 200 p.s.i.g. The olefin reactant (B) was the same material as that employed in Runs 8–15 above.

TABLE IV

| Run number | Tablet crushing strength, p.s.i. | LHSV | Mol ratio, A/B | Product (weight, percent)[a] | | | |
|---|---|---|---|---|---|---|---|
| | | | | $C_5$ olefin | Olefin dimer | Amyl- benzenes | Heavies |
| 16 | 20 | 3 | 10/1 | 12.5 | 14.1 | 36.7 | 36.7 |
| 17 | 10 | 3 | 10/1 | 3.9 | 11.6 | 54.8 | 29.7 |
| 18 | 5 | 3 | 10/1 | 4.2 | 11.0 | 52.1 | 32.7 |
| 19 | 5 | 6 | 10/1 | 5.2 | 11.8 | 57.1 | 25.9 |
| 20 | 5 | 9 | 10/1 | 3.8 | 12.6 | 54.8 | 28.8 |
| 21 | 5 | 3 | 5/1 | 4.9 | 12.3 | 41.0 | 41.8 |

[a] Values normalized excluding unreacted benzene.

These results in Table IV demonstrate that the catalyst tablets of relatively higher average crushing strength were less active than those of relatively lower average crushing strength. In addition, Runs 18–20 illustrate the effect of flow rate on product distribution and Runs 18 and 21 illustrate the effect of the mol ratio of benzene to olefin on amylbenzene yield.

Example V

In another run (No. 22) the tubular reactor system described above was employed with the powdered montmorillonite clay catalyst used in Example I for the alkylation of cumene with isobutylene. The temperature was 180° C. at 200 p.s.i.g. with a flow rate of 2 LHSV and the mol ratio of cumene to isobutylene (A/B) was 9.7/1. Analysis (GLC) of the reactor effluent after about four hours on stream showed 12.9% $C_4$ olefin, 8.8% olefin dimer, 40.7% of two unidentified compounds, 35.1% heavies and only 2.5% p-tert-butylcumene. Again, the values were normalized excluding unreacted cumene.

Example VI

Other runs using the reactants of Example V were conducted employing a tableted montmorillonite clay catalyst prepared from the powdered form which was used in Example V. The montmorillonite clay, was tableted using the same "dry" process as was used in the preparation of the catalyst in Example II. These tablets had an average crushing strength of 5 p.s.i. The conditions employed in these runs and the results obtained are shown in Table V below. Each run was conducted at 200 p.s.i.g.

TABLE V

| Run number | Temperature, °C. | LHSV | Mol ratio, A/B | Product (weight, percent)[a] | | | | | |
|---|---|---|---|---|---|---|---|---|---|
| | | | | $C_4$ olefin | Olefin dimer | D[b] | E[c] | F[d] | Heavies |
| 23 | 185 | 2 | 10/1 | 6.8 | 2.8 | 7.6 | 11.2 | 58.0 | 13.6 |
| 24 | 160 | 2 | 5/1 | 7.6 | 10.0 | 15.2 | 9.1 | 32.2 | 26.1 |
| 25 [e] | 165 | 4 | 8.5/1 | 11.8 | 5.6 | 17.0 | 12.2 | 26.6 | 22.2 |
| 26 | 135 | 2 | 9/1 | 2.9 | 3.5 | 5.2 | 6.6 | 71.1 | 10.7 |
| 27 | 135 | 2 | 9.5/1 | 5.2 | 2.6 | 7.9 | 10.3 | 60.0 | 13.9 |
| 28 | 115 | 2 | 9/1 | 4.6 | 4.1 | 10.9 | 9.9 | 48.2 | 22.2 |
| 29 | 125 | 2 | 9/1 | 4.8 | 4.5 | 10.1 | 8.5 | 54.1 | 17.8 |
| 30 | 130 | 4 | 9/1 | 6.1 | 2.8 | 11.3 | 9.8 | 50.4 | 19.4 |
| 31 | 130 | 4 | 9.5/1 | 6.2 | 3.1 | 13.1 | 10.7 | 50.8 | 16.0 |

[a] Values normalized excluding unreacted cumene.
[b] Compound D is 1,1,3,3-tetramethylindane.
[c] Compound E is m-tert butylcumene.
[d] Compound F is p-tert-butylcumene.
[e] The product also contained 3.4 percent of an unidentified compound.

The results in Table V demonstrate that the tableted montmorillonite clay catalyst gave much improved yields of the p-tert-butylcumene compared to use of the powdered montmorillonite clay catalyst in Example V. Run 26 shows a particularly good yield of the p-tert-butylcumene.

Example VII

Additional runs were conducted for the alkylation of benzene (A) with a mixture of cis- and trans-2-butene (B), olefins outside the scope of suitable olefins for this invention. These runs employed either the powdered montmorillonite clay previously described (Filtrol grade 71) or the tableted form of the same clay (average crushing strength of about 5 p.s.i.). The same tubular reactor system previously employed was also used in these runs. A temperature of 180° C., a pressure of 200 p.s.i.g., and a flow rate of 3 LHSV was employed in each of the runs. The results are shown below in Table VI.

TABLE VI

| Run No. | Mol ratio, A/B | Catalyst type | Product (weight, percent) [a] | | | |
|---|---|---|---|---|---|---|
| | | | C$_4$ olefin | sec-Butyl-benzene | n-Butyl-benzene | Heavies |
| 32 | 7.7/1 | Powder | 1.8 | 88.2 | Trace [b] | 10.0 |
| 33 | 7.2/1 | do | 1.1 | 89.3 | do | 9.6 |
| 34 | 7.0/1 | Tableted [c] | (d) | 77.2 | 3.6 | 19.2 |
| 35 | 7.0/1 | do | (d) | 76.7 | 5.7 | 17.6 |

[a] Values normalized excluding unreacted benzene.
[b] The GLC chromatogram indicated its presence but in too small a quantity to calculate.
[c] This catalyst was tableted with 3 percent by weight graphite lubricant and had been previously employed in a run in which benzene was alkylated with 2-methyl-2-butene.
[d] Not detected by GLC analysis.

These results surprisingly demonstrate that the powdered montmorillonite clay in combination with a mixture of cis- and trans-2-butene gave better results in the alkylation of benzene than the tableted form of the same clay catalyst. These results, which are contrary to those of the earlier examples, point out the importance of the olefin reactant in achieving the improved results according to this invention.

As will be evident to those skilled in the art many variations and modifications of this invention can be practiced in view of the foregoing disclosure. Such variations and modifications are clearly believed to come within the spirit and scope of the invention.

I claim:

1. A process for the alkylation of an aromatic hydrocarbon which comprises reacting the aromatic hydrocarbon with an acyclic olefin having the formula

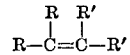

wherein R is hydrogen or R', and R' is an alkyl radical having from one to six carbon atoms, in the liquid phase in the presence of an alkylation catalyst comprising montmorillonite clay which has been compacted into tablets, each tablet having a crushing strength of from 3 to 15 pounds.

2. A process according to claim 1 in which the aromatic hydrocarbon has the formula

wherein $n$ is one or two, Z is phenyl when $n$ is one and phenylene when $n$ is two, and R" is hydrogen or an alkyl radical having from one to twelve carbon atoms.

3. A process according to claim 1 in which the montmorillonite clay has been activated prior to tableting by reaction with a mineral acid.

4. A process according to claim 3 in which the reaction is carried out at a temperature within the range of 100–200° C. and at a pressure which is sufficient to maintain the aromatic hydrocarbon substantially completely in the liquid phase.

5. A process according to claim 4 in which the molar ratio of aromatic hydrocarbon to olefin is 5:1 to 15:1.

6. A process according to claim 5 in which the aromatic hydrocarbon is benzene and the olefin is 2-methyl-2-butane.

7. A process according to claim 5 in which the aromatic hydrocarbon is cumene and the olefin is isobutylene.

References Cited

UNITED STATES PATENTS

| | | | |
|---|---|---|---|
| 2,564,488 | 8/1951 | Mahan | 260—671 C |
| 2,574,895 | 11/1951 | Stecker | 260—672 R |
| 2,579,576 | 12/1951 | Hickey | 208—120 |
| 2,584,103 | 2/1952 | Pines et al. | 260—671 C |
| 2,589,057 | 3/1952 | Corson et al. | 260—671 R |
| 2,881,227 | 4/1959 | Keizer | 260—671 P |
| 2,930,819 | 3/1960 | Aries | 260—671 C |
| 2,976,723 | 3/1961 | Eddy | 73—81 |
| 3,213,037 | 10/1965 | Hodgkiss | 252—450 |
| 3,459,815 | 8/1969 | Noddings et al. | 252—450 |

CURTIS R. DAVIS, Primary Examiner

U.S. Cl. X.R.

260—671 R, 671 P